(12) United States Patent
Palamides

(10) Patent No.: US 6,895,261 B1
(45) Date of Patent: May 17, 2005

(54) PORTABLE, WIRELESS COMMUNICATION APPARATUS INTEGRATED WITH GARMENT

(76) Inventor: Thomas R. Palamides, 22730 Runnymede, West Hills, CA (US) 91307

(*) Notice: Subject to any disclaimer, the term of this patent is extended or adjusted under 35 U.S.C. 154(b) by 509 days.

(21) Appl. No.: 09/615,357

(22) Filed: Jul. 13, 2000

(51) Int. Cl.⁷ .................................................. H04B 1/38
(52) U.S. Cl. ...................... 455/575.6; 455/100; 455/344
(58) Field of Search ............................. 455/575.1, 575.6, 455/100, 343.1–343.6, 344, 349, 351, 575, 343; 381/24, 187, 205

(56) References Cited

U.S. PATENT DOCUMENTS

| | | | | |
|---|---|---|---|---|
| 4,539,700 A | * | 9/1985 | Sato | 381/333 |
| 4,876,724 A | * | 10/1989 | Suzuki | 381/385 |
| 5,148,002 A | * | 9/1992 | Kuo et al. | 219/211 |
| 5,416,310 A | | 5/1995 | Little | 235/462 |
| 5,555,490 A | | 9/1996 | Carroll | 361/686 |
| 5,563,951 A | * | 10/1996 | Wang et al. | 381/301 |
| 5,774,338 A | * | 6/1998 | Wessling, III | 361/730 |
| 5,798,907 A | * | 8/1998 | Janik | 361/683 |
| 5,868,723 A | | 2/1999 | Al-Sabah | 604/361 |
| 5,884,198 A | * | 3/1999 | Kese et al. | 455/575 |
| 5,893,991 A | | 4/1999 | Newell | 219/211 |
| 5,912,653 A | | 6/1999 | Fitch | 345/87 |
| 6,041,243 A | * | 3/2000 | Davidson et al. | 455/575.1 |
| 6,243,870 B1 | * | 6/2001 | Graber | 2/69 |
| 6,324,053 B1 | * | 11/2001 | Kamijo | 361/683 |
| 6,381,481 B1 | | 4/2002 | Levendowski et al. | 600/383 |
| 6,381,482 B1 | | 4/2002 | Jayaraman et al. | 600/388 |

OTHER PUBLICATIONS

Carvalho, Ivan, "Every Breath You Take," Wired, Mar. 2000 (p. 77), printout from www.vivometrics.com (2 pages).

Fields, Julie, (Edited by Robin J. Phillips) "A Fashion Statement for Your Vital Signs—Startup LifeShirt.com has VC's hearts fluttering with a T–shirt that keeps tabs on your cardiac and respiratory functions" BusinessWeek online, Sep. 8, 2000 (3 pages).

"LifeShirt™ System: A Complete Process for Secure 24+7 Data Collection, Transmission, Analysis & Reporting," 2001 VivoMetrics, Inc., printout from www.vivometrics.com (1 page).

"LifeShirt™: How It Works," 2001 VivoMetrics, Inc., printout from www.vivometrics.com (1 page).

* cited by examiner

Primary Examiner—Nay Maung
Assistant Examiner—Edan Orgad
(74) Attorney, Agent, or Firm—Irell & Manella LLP

(57) ABSTRACT

A portable communication apparatus suitable for integration into a garment includes a host unit, an interface and an interactive communication unit. The host unit comprises a removable host device which can be docked into a docking station located in, e.g., the torso area of the garment, and may also be used in a standalone fashion when undocked. The host unit is connected to the interactive communication unit through an interface, which may be a wired or wireless interface. The interactive display unit is preferably located at the end of the sleeve, and may include a graphical display device, a microphone, a speaker, and/or user-activated buttons. The host device may act as a pager as well as perform other functions, and may be replaced with another host device in the docking station having different function and features. The host unit may have a data port, which may be used to connect a remote speaker located in another area of the garment, such as the collar, near the wearer's ear. The communication apparatus may provide advanced messaging, cellular telephony, IP telephony, digital audio generation and/or pager functionality.

40 Claims, 6 Drawing Sheets

PORTABLE, WIRELESS COMMUNICATION APPARATUS INTEGRATED WITH GARMENT

BACKGROUND OF THE INVENTION

1. Field of the Invention

The field of the present invention relates to wireless, portable communication devices for use with apparel.

2. Background

A variety of portable communication devices have been developed in response to consumer demand for increased mobility and convenience. Pagers and advanced messaging devices, for example, provide consumers with portable messaging capabilities. Some of these devices have additional built-in functionality, such as pager-to-pager messaging and pager-to-telephone messaging. They also offer a relatively long battery life and are relatively small. One shortcoming of these products, however, is that they typically must be carried (e.g., in a pocket or purse, or on a belt), causing some level of inconvenience when needing to access their display and/or control functions. They may also be inconvenient to carry and, while relatively small, can nevertheless be uncomfortably bulky when needing to be carried on a person (such as in a pocket or small purse, for example). Also, because of their size, and due to the fact that many consumers prefer to carry these types of communication products with them almost constantly, these products can be misplaced, lost or stolen rather easily.

Another disadvantage of pager and messaging devices is that they are generally limited in their functionality. For example, they typically only offer alphanumeric displays, with no voice communication capability. Since they tend to be self-contained, they are usually not expandable in terms of functionality.

Another type of wireless communication device is the cellular telephone, which allows full-duplex transmission (e.g. bi-directional voice communication) within the geographical area covered by a cellular system. However, cellular telephones have many of the same shortcomings as pager and messaging services. For example, cellular telephones, like pagers and messaging devices, must generally be carried on the person—e.g., in a pocket, purse, or on a belt. This may make it inconvenient when needing to access the device. Cellular telephones are usually even more bulky than pagers and messaging devices, and therefore can be even more uncomfortable to carry in a pocket, purse or belt, particularly if the user has none of these options available. Because cellular telephones are portable, and are carried around by some users almost constantly, they can also be easily misplaced, lost or stolen, like pages or messaging devices.

Also like pager and messaging devices, cellular telephones are typically self-contained and have limited or no expandability, in terms of adding functionality.

More advanced cellular-type telephones have recently been developed, which communicate via the global electronic data network, commonly known as the Internet. Such so-called "IP telephones" generally provide not only voice communication capabilities, but also provide at least some limited Internet access. IP telephony is an emerging field and, while offering the potential for increased functionality over traditional cellular telephones, nevertheless does not satisfactorily address the aforementioned drawbacks of traditional cellular telephones.

One attempt to provide increased functionality in a single unit, and perhaps to attempt to address some of the drawbacks of traditional portable communication devices, involves integrating a high-tier pager function into a wristwatch. Beepwear Paging Products (a joint effort of Motorola and Timex corporations), for example, commercially manufactures such a wristwatch-style pager. The pager/wristwatch portion of this device can be detached from the watchband and clipped to a belt. Further details about devices made by Beepwear Paging Products are presently available at the web site "www.beepwear.com".

While providing the functions of both a wristwatch and pager in a single device, the Beepwear product nevertheless is limited in functionality. For example, it does not provide voice communication capabilities. Since it is entirely self-contained, the device's functionality is not expandable. In addition, while the pager/wristwatch portion of the Beepwear device is detachable, whether it is attached or removed from the wristband it is still subject to being lost or stolen, just like an ordinary wristwatch, belt-worn pager, or messaging device. Because of the incorporation of pager functionality, the pager/wristwatch portion is generally larger and heavier than a normal wrist-worn watch, which may make it less desirable for wearers who are interested in a less obtrusive device. The Beepwear device also might be viewed, at least by some, as aesthetically unattractive, or else limited from a fashion standpoint, since the device is currently provided in limited styles that will not necessarily appeal to a broad demographic market (e.g. men, women, children, teens, business people, sports, entertainment, etc.).

Accordingly, it would be advantageous to provide a portable, wireless, communication apparatus that are lightweight and versatile, with a variety of available functions. It would further be advantageous to provide such an apparatus that is less prone to being misplaced, lost or stolen, is less bulky and provides increased options for enhancing fashionability and visual appeal. It would also be advantageous to provide a family of apparatuses that provide some or all of the aforementioned features, while further providing the possibility of expanding functionality and user options.

SUMMARY OF THE INVENTION

The invention is generally directed, in one aspect, to a portable, wireless, communication apparatus suitable for integration into a garment. The portable, wireless communication apparatus may be part of a family of apparatuses providing different functions and features to the user, and which are readily interchangeable and useable in the same platform.

In a preferred embodiment, the portable, wireless communication apparatus comprises a host unit (preferably with a docking station), an interface, and an interactive communication unit, suitable for integration into a garment. The host unit is preferably attached to an unobtrusive location on the interior of a garment, such as in the torso area, so as to provide a minimum of wearer discomfort. The interactive communication unit is preferably also attached to the garment, but in a location that is convenient for access by the wearer, such as the end of the sleeve. The interactive communication may provide various audio displays and/or control functions, and may comprise a speaker, microphone, graphical display and/or one or more buttons or manual, voice-activated or infrared data entry means.

In a preferred embodiment, the host unit and interactive communication unit collectively provide wireless communication capabilities, such as paging, advanced messaging, voice communication, and/or entertainment features (e.g., electronic games, music, television, video, etc.). The host unit is preferably microprocessor-based with multi-platform capabilities, so that the functional portion of the host unit may be used independently or while resident in the docking station attached to the garment.

Further embodiments, modifications, variations and enhancements are also described herein.

BRIEF DESCRIPTION OF THE DRAWINGS

FIG. 4A shows a front view of an embodiment using boss design webbing, and FIG. 4B gives a side view of a preferred docking station housing, including its thin-layered webbing.

FIG. 5A depicts a top view.

DETAILED DESCRIPTION OF PREFERRED EMBODIMENTS

Figure 1:
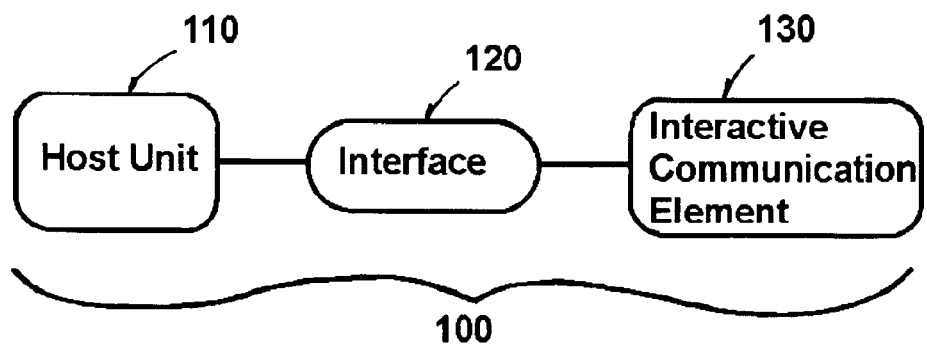
FIG. 1 is a conceptual diagram of a split function format in accordance with a preferred embodiment of a portable, wireless communication apparatus as disclosed herein.

FIG. 1 is a block diagram of a portable, wireless communication apparatus 100 suitable for integration into a garment, in accordance with one embodiment, as discussed herein. As illustrated in FIG. 1, the wireless communication apparatus 100 preferably comprises three units: the host unit 110 (preferably comprised of a host device 300 and docking station 370, as further described herein) and an interface 120, which connects the host unit 110 and the interactive communication unit 130.

The host unit 110 preferably contains or is connected to a power source (e.g. battery), along with core electronics and software application protocols for managing the communication functions of the wireless communication apparatus 100. The host unit 110 may comprise a microprocessor and associated support circuitry for controlling the processing of communication signals and for handling the top-level logic needed to manage the functionality of the various components of the wireless communication apparatus 100. The host unit 110 may also include an antenna, either integrally, or externally connected to it. In some embodiments the host unit 110 may also include removable/replaceable flash memory.

As later described herein with respect to FIGS. 3A and 3B, the host unit 110 may comprise more than one physical component and, more specifically, may comprise a host device 300 and a docking station 370 into which the host device 300 may be placed. The host device 300 may be removed from the docking station 370 and operated as a freestanding component by the user. The host device 300 may also be replaced or upgraded with another host device having different or more functionality, yet compatible with the same overall platform.

Figure 6:
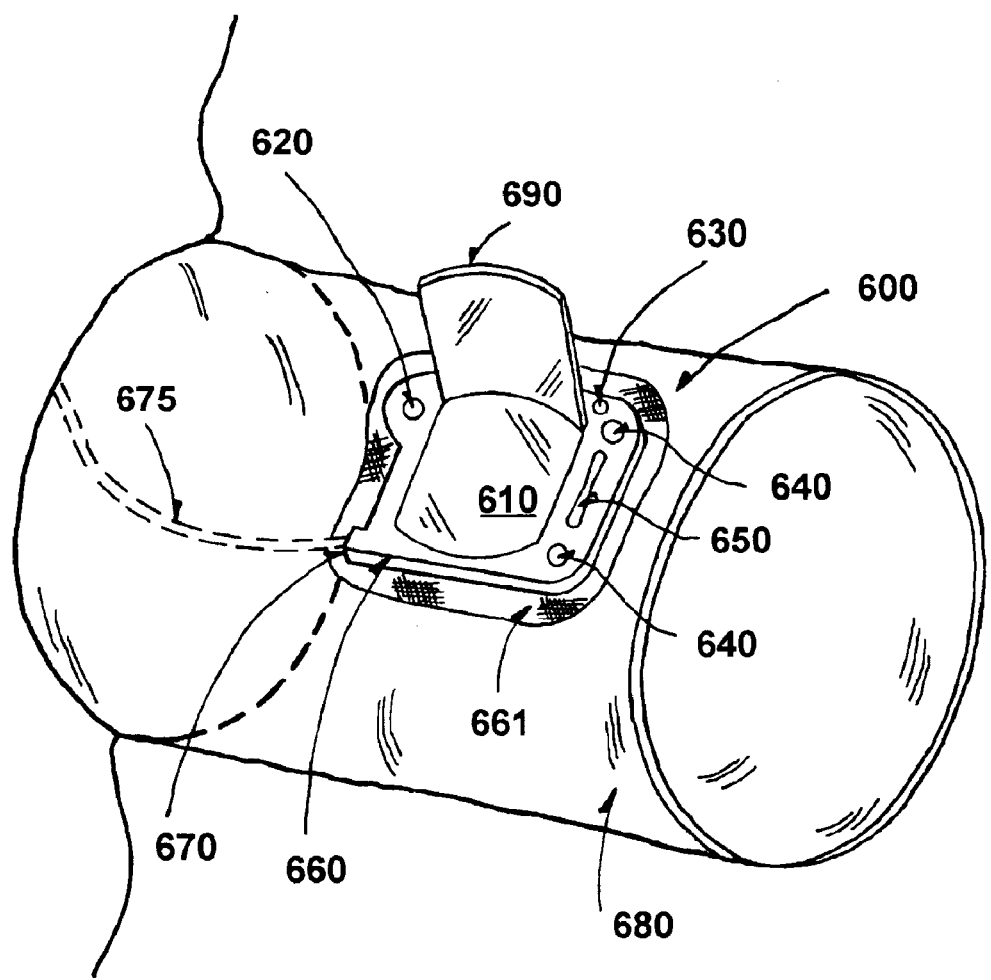
FIG. 6 is a diagram of a left arm shirt sleeve and cuff illustrating one possible placement and orientation of the interactive communication unit.

The interactive communication unit 130 of the wireless apparatus 100 preferably comprises various components providing audio, visual and/or other user-interactive features. For example, as illustrated in FIG. 6, the interactive communication unit 130 may in some embodiments comprise a microphone 630, a speaker 620, a graphical display 610 (e.g. a liquid crystal display (LCD)), and/or various buttons 640 or other manual, voice-activated or infrared data entry means 650.

The host unit 110 may communicate with the interactive communication unit 130 over the interface 120 which, as noted above, may include a wired or wireless connection. The interface 120 may thus comprise a direct electrical connection (such as, for example, a wire, conductive filament, conductive tape or fiber-optic line), or else may include a short-range wireless interface, separate and distinct from the long-range wireless functionality provided by the wireless communication apparatus 100.

The interface 120 may also have a mechanism for allowing connection to a peripheral appliance. For example, the interface 120 may comprise a bifurcating plug-in option for connection to a peripheral appliance, such as a voice or hearing device. The plug-in port may reside anywhere on the garment 200 (see FIG. 2); however, for aesthetics and convenience, it would preferably be located on the interior torso region of the garment 200. The interface 120 may also connect to a photovoltaic cell, or an array of cells, arranged in either a series or parallel architecture, which may supplement the power supply or recharge the battery (or batteries). Photovoltaic cells may be placed anywhere on the exterior of the garment 200 that is exposed to light, including the collar, sleeve, or as part of the interactive display unit 130.

If the interface 120 is wireless, the host unit 110 and the interactive communication unit 130 may be provided with a low-power, short-range, transceiver for conducting bi-directional wireless communication using any suitable wireless technique and protocol (e.g. spread spectrum communication in unlicensed frequency bands).

The wireless communication apparatus 100 may provide a variety of different wireless communication or user-interactive functions, particularly when the apparatus 100 is integrated with apparel as described further herein. For example, the wireless communication apparatus 100 may provide paging, advanced message, IP telephony, cellular telephony, digital sound generation, speech recognition, and/or other such functions.

Figure 2:
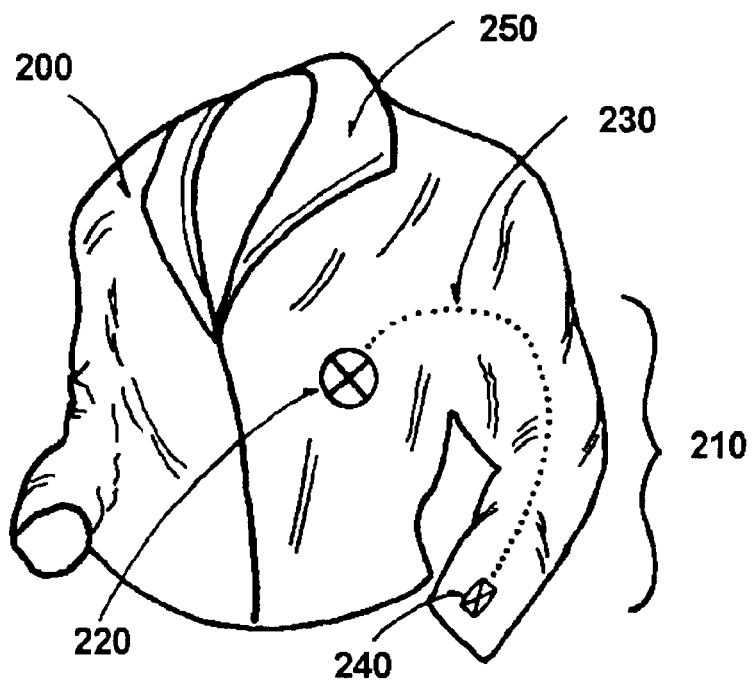
FIG. 2 is a diagram of a typical garment showing one possible placement of various components of a portable, wireless communication apparatus.

FIG. 2 is a diagram illustrating an example of the incorporation of a wireless communication apparatus (such as wireless communication apparatus 100) into a garment 200, such as a shirt or a jacket. As shown in FIG. 2, a wireless communication apparatus 210 incorporated into the garment 200 includes a host unit 220, interactive communication unit 240, and (in this example) a wired interface 230. A preferable placement of a host unit 220 is in the torso portion of the garment 200, although it may be placed elsewhere on the garment 200. The torso location is preferred, at least in some embodiments, because it provides easy access for installation and/or removal, if desired, of the host unit 220, and good weight distribution.

The interface 230 connects the host unit 220 with the interactive communication unit 240. The interface 230 may be either a wired or a wireless type connection, but in the present example is shown as a wired connection. Preferably, the interface 230 comprises one or more electrical wire(s), one or more conductive filament(s), conductive tape or one or more fiber optic line(s). If embodied as a wired type connection, the wire or other data transport element of the interface 230 should be conductive and able to withstand movement and stretching. If conductive filaments are used, they may be integrated into the fabric of the garment 200, so that they are not externally visible are minimally noticeable to the wearer. The interface 230 may also be constructed by threading thin tubes containing wires into a seam of the garment 200. Another possibility is using a helical, spring-like cord for the interface 230.

The interactive communication unit 240 is preferably attached at a convenient, accessible location on the garment 200, such as, for example, on the end of a sleeve or cuff of the garment 200. Such a location provides relatively easy viewing and convenient access to the wearer, if required to speak into or listen to the interactive communication unit 240 or manipulate its manual controls. The interactive communication unit 240 can alternatively be placed elsewhere on the garment 200, such as, for example, the collar 250.

The host unit 220 may include any of the features described above with respect to host unit 110 in connection with FIG. 1. For example, the host unit 220 may contain or be connected to a power source (e.g. battery), antenna, core electronics and software application protocols for managing the communication functions of the wireless communication apparatus 210. The host unit 220 may comprise, e.g., a microprocessor and associated support circuitry for controlling the processing of communication signals and for handling the top-level logic needed to manage the functionality of the various components of the wireless communication apparatus 210. The host unit 220 is preferably comprised of multiple physical components, such as a host device 300 and a docking station 370 (as illustrated in FIGS. 3A and 3B, described hereinafter).

The interactive communication unit 240 may include any of the features described above with respect to interactive communication unit 130. For example, the interactive communication unit 240 may comprise various components providing audio, visual or other user-interactive features. The interactive communication unit 240 may, as illustrated in FIG. 6, comprise a microphone 620, a speaker, a graphical display 610 (e.g. a liquid crystal display (LCD)), various buttons 640, 650 and/or other manual, voice-activated or infrared data entry means.

In one embodiment, the host unit 220 comprises an MMC2080 type baseboard compliant with a FLEX™ receiver as manufactured by Motorola Corporation, for providing, among other things, advanced messaging capability. The receiver may be built around a low-power M*CORE™ RISC microcontroller with a FLEX™ Stack API. Other types of platforms and electronic components may be used, depending upon the total functionality of the wireless communication apparatus 210 (e.g., cellular communications, IP telephony, paging, etc.) and the capacity to integrate, if necessary, the particular components.

Figure 3A:
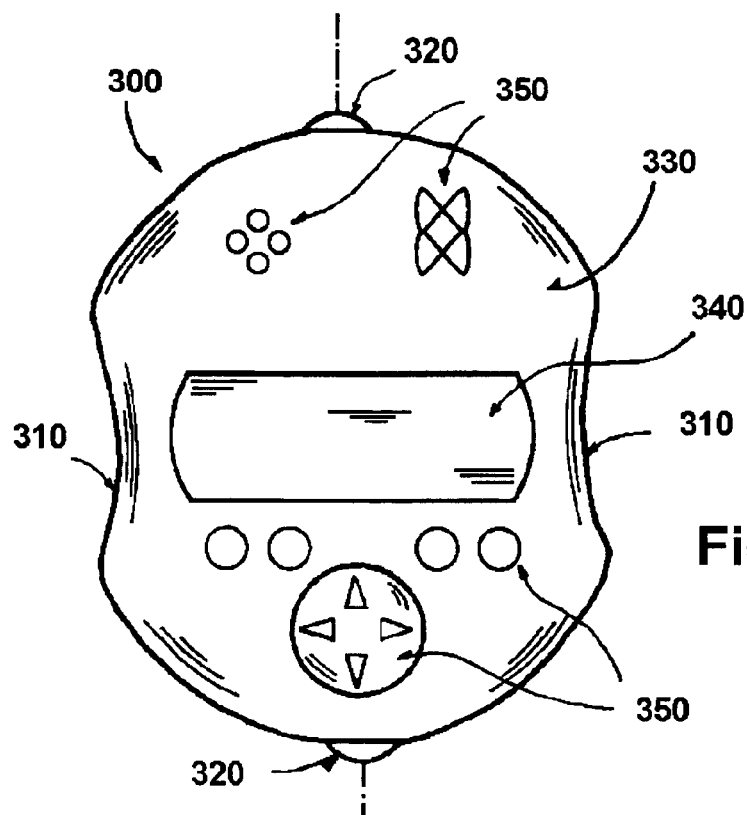
FIGS. 3A, and 3B are a top-view diagram and an oblique-view diagram, respectively, of a portable, wireless communication apparatus showing physical characteristics and features of an embodiment of a host device (FIG. 3A) and a docking station (FIG. 3B).
Figure 3B:
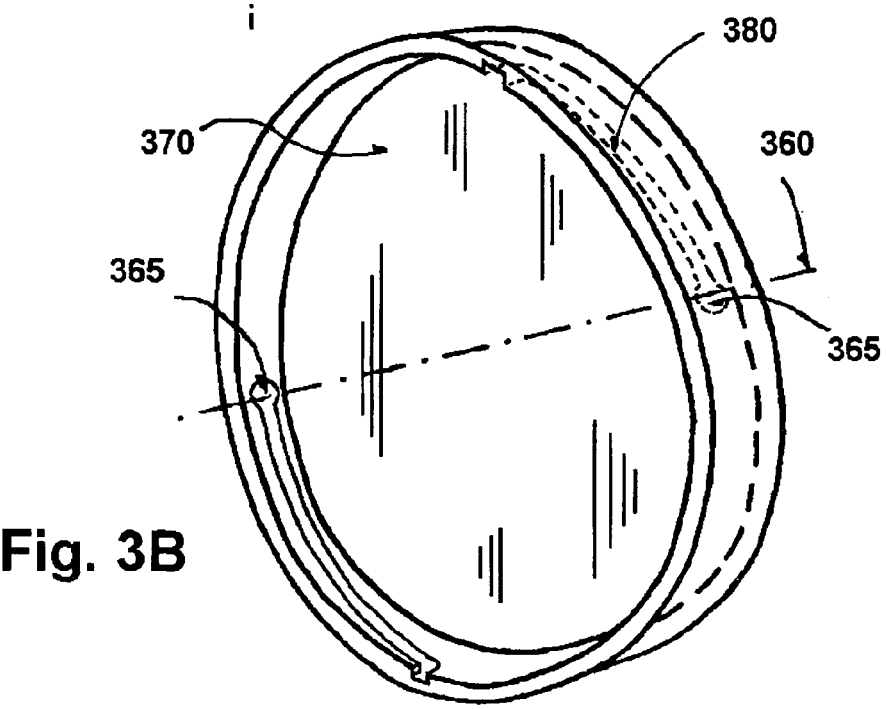

A preferred host unit (as may be incorporated in either of the embodiments illustrated in FIG. 1 or 2) is illustrated in FIGS. 3A and 3B. As shown in FIGS. 3A and 3B, a host unit preferably includes a host device 300 (FIG. 3A) which may be affixed to, attached to, or inserted into a docking station 370. When the host device 300 is resident in the docking station 370, it controls the activity of the interactive communication unit 130 or 240. However, the host device 300 is preferably removable from the docking station 370, such that certain standalone features of the host device 300 may be used. These standalone features may include a separate speaker, microphone, display, manual buttons, infrared data entry, and/or any other interactive features provided by the interactive communication unit 130 or 240. The host device 300 may, for example, have an independent display 340 and independent control functions 350 so that it can be used in a free standing manner when undocked.

The host device 300 and docking station 370 are preferably constructed from durable yet lightweight material (e.g. high-impact plastic), so as to withstand fatigue, moisture, corrosion, and shock. The host device 300 may have a casing 330 to provide durability and water resistance. The casing 330 may include a flip cover 690 (as illustrated in FIG. 6), underneath or within which the display 340 and control functions 350 may reside. The control functions 350 may include a numeric keypad, or some variation thereof.

The connection between the host device 300 and the docking station 370 may include any attachment mechanism that will securely attach or lock the host device 300 to the docking station 370. In a particular embodiment illustrated in FIGS. 3A and 3B, the docking station 370 includes tapered spiral grooves 380 for allowing the host device a to be attached to the docking station 370. In such an embodiment, the host device 300 may include spring-loaded buttons 320 or other protrusions at the top and bottom, or elsewhere, to guide it into the docking station 370. The host device 300 thus may be inserted into the docking station 370 by sliding the spring-loaded buttons 320 along the spiral grooves 380 until they come to rest in holes 365 in which the buttons 320 (or other protrusions) will be securely fastened. Thus, the host device 300 may be engaged with a twisting motion, providing the ability to dock the host device 300 with one hand, if desired. A wide variety of other means may be used to attach or secure the host device 300 into a docking station 370, including snap-on, sliding groove, or other techniques, or even traditional means such as screws.

The host device 300 and docking station 370 are preferably (but need not be) symmetric, so as to facilitate use by both left-handed and right-handed wearers. The host device 300 may have indented sides 310 to facilitate manual docking and undocking. The host device 300 is preferably small and flat, and is sized to the average hand to facilitate manual usage.

Where the host unit 220 is embodied as a host device 300 and docking station 370 (as in, e.g., FIGS. 3A and 3B), the docking station 370 is preferably integrated into the garment 200 that may be worn by a person as either part of normal daily wear, or in connection with a specialized endeavor (e.g., sports, outdoor activity, emergency or rescue operations, etc.). The host device 300 and docking station 370 can be placed anywhere on the garment 200 that provides enough fabric to support the weight of the unit. A possible location may be the chest or torso area of the garment 200. Such a location is helpful in distributing the weight of the host unit 220 and may provide a convenient place for the host device 300 to be docked and undocked.

Figure 4A:
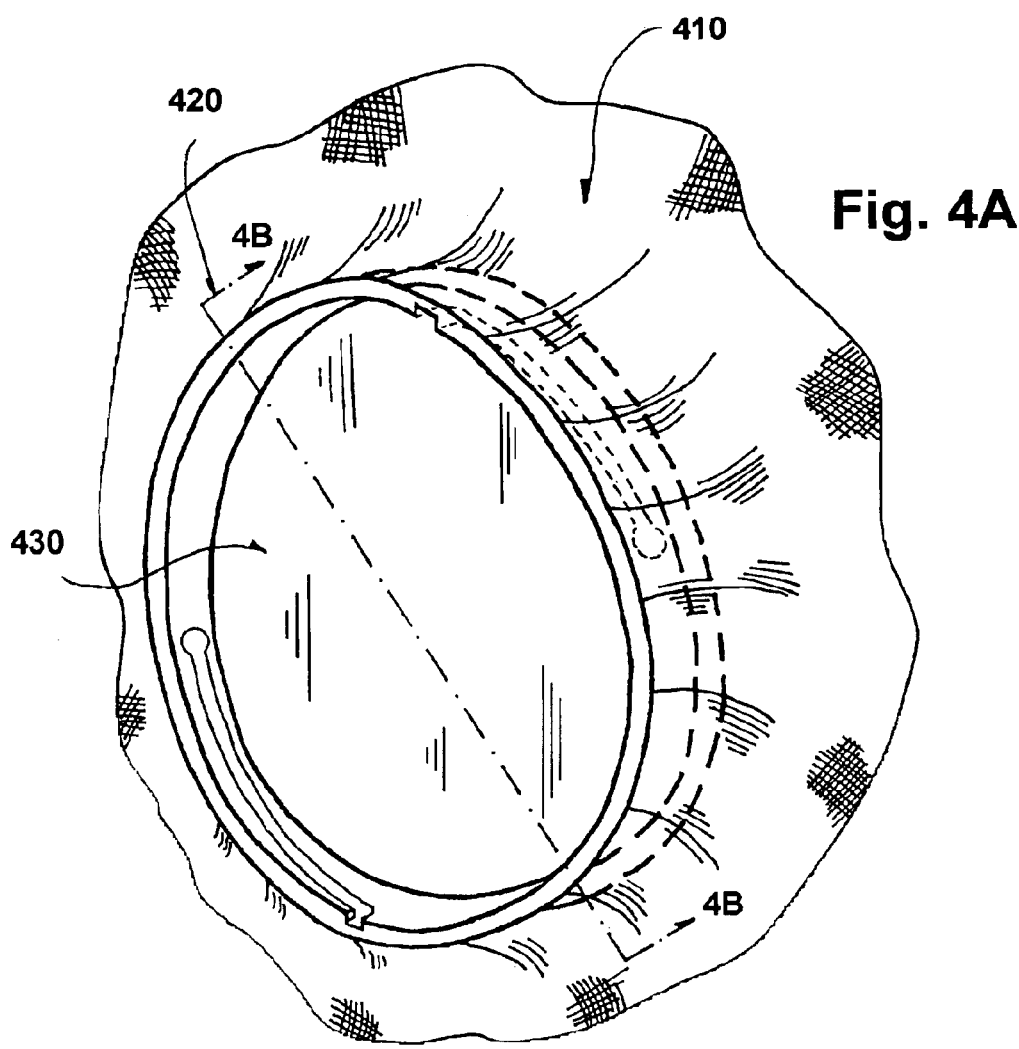
FIGS. 4A and 4B are a top-view and a side-view diagram, respectively, of a docking station illustrating one possible means for connecting the docking station to a garment.
Figure 4B:
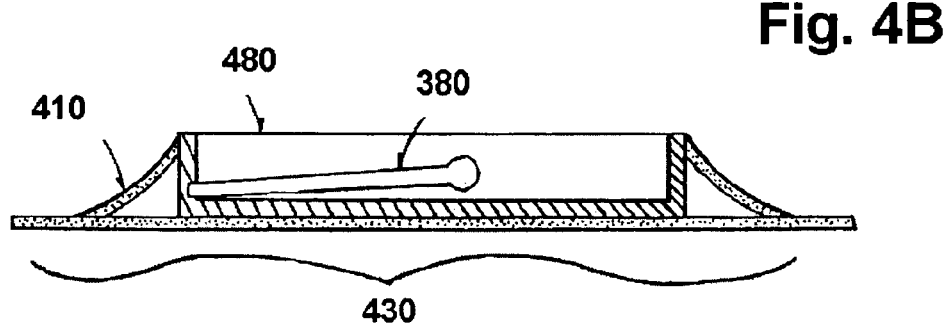

The host unit 220 (particularly the docking station 370) may be stitched or bonded onto, or otherwise physically secured to, the garment 200 in any of a variety of ways. For example, as illustrated in FIGS. 4A and 4B, the docking station 370 may have a docking station base 430 which is fastened to the garment 200 by threading through a webbing 410 which may be comprised of, e.g., thin-walled acrylic. The webbing 410 forms a ring of material around the casing portion 480 of the docking station 370 and may be permanently joined thereto. The webbing 410 and docking station casing 480 are preferably made of a material durable enough to withstand-active use and washing (e.g. nylon), and soft enough not to irritate a person's skin. The webbing 410 preferably has a similar enough of a chemical composition to that of the docking station casing 480 so that it can be injected, or bonded, during a molding process. The webbing 410 preferably contains small holes or perforations wide enough for a stitching needle. The holes or perforations in the webbing 410 may form a progressive pattern, or "boss" design, as illustrated in FIG. 4A.

Figure 5A:
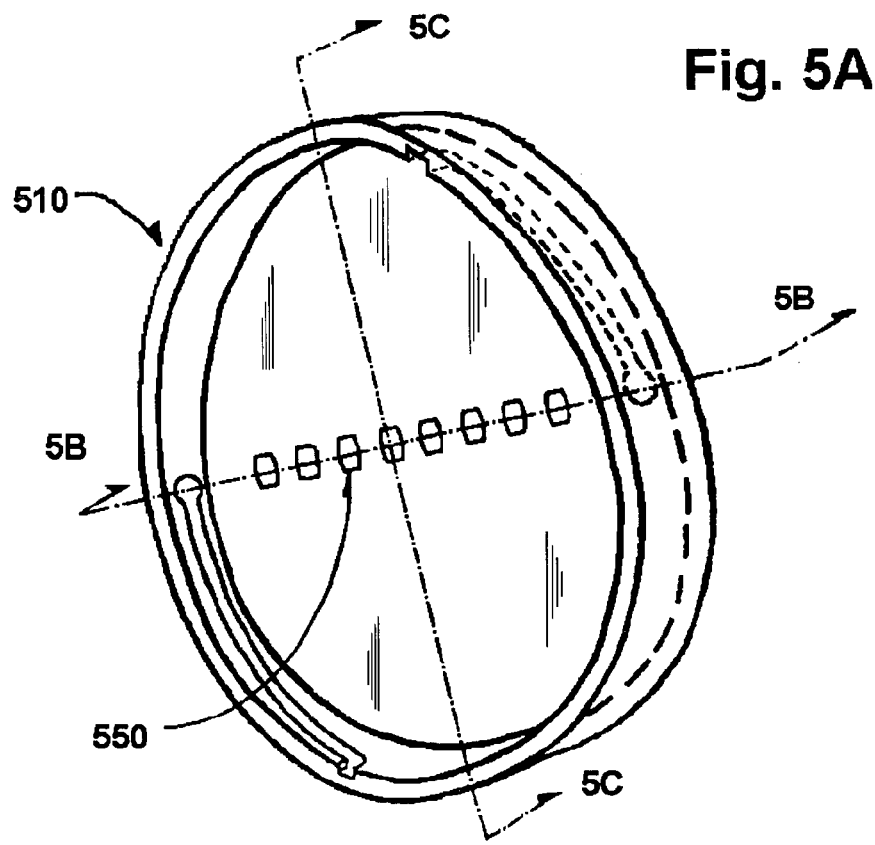
FIGS. 5A and, 5B and 5C are diagrams from different perspectives, illustrating one possible electrical interface between a host device and a docking station.
Figure 5B:
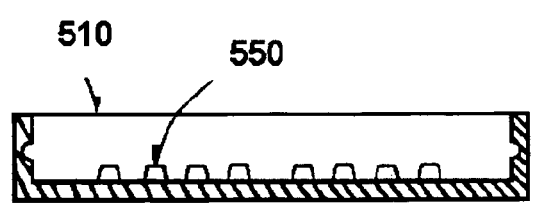
FIG. 5B depicts one cross-sectional view.
Figure 5C:
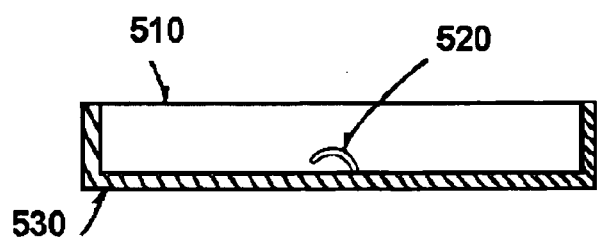
FIG. 5C depicts another cross-sectional side view, corresponding to the centerline shown in FIG. 5A.

FIGS. 5A and, 5B and 5C are diagrams from different perspectives, illustrating one possible electrical interface between a host device and a docking station (such as host device 300 and docking station 370 shown in FIGS. 3A and 3B, for example). FIG. 5A depicts a top view of a docking station casing 510, FIG. 5B depicts a cross-sectional view thereof, and FIG. 5C depicts another cross-sectional side view, corresponding to the centerline shown in FIG. 5A. The interface between a host device and the docking station casing 510 may, as shown in FIG. 5, include conductive contacts 550, generally positioned in a linear fashion along the center of the docking station casing 510. The host device (not shown in FIGS. 5A and 5B) may have an electrical interface mirroring that of the docking station casing 510, so that when docked the connection provides uninterrupted contact through a low-pressure interface. Any standard or non-standard electrical interface may be used to connect the host device with the docking station casing 510. In a preferred embodiment, the electrical interface provided by the contacts 550 is a "universal" interface that allows connectivity to a variety of different host devices, although the interface may also be of a proprietary nature.

The docking station casing 510 may be constructed from molded plastic, using an injection molding process. The docking station casing 510 may be of a variety of other different shapes and sizes, but is preferably small and flat to minimize bulk and maximize comfort to the wearer. The contacts 550 on the docking station casing 510 may be made of a conductive, corrosive-resistant, and fatigue-resistant material, such as a metal. The contacts 550 may be formed in the shape of flexible, metallic bands, as illustrated in FIGS. 5A, 5B and 5C. Alternating conductive and non-conductive materials may be used to separate the conductive contacts 550, although a single conductive bus may be used instead. The contacts 550 may be fabricated as a sub-component to simplify manufacturing and testing. The contacts 550 may be arranged in the necessary sequence and connected to a common bus through a technique such as resistance welding or soldering. The contacts 550 may also be rounded so as to facilitate engagement of a host device.

In a preferred embodiment, when initially docked, the host device display 340 powers down while the interactive communication unit's display 610 (see FIG. 6) and other electronic functions power up. The host device 300 may selectively power down the host device display 340 based upon electronic detection of the presence of the interactive communication unit 370, or by detecting when it is electrically connected to or otherwise resident in the docking station 370. The conservancy of power in this and other similar fashions may lead to better power management, and preferably provides "always-on" capabilities to the user.

The communication device preferably includes an antenna (not shown). The antenna may be placed in or be attached to the host unit 110 or 220 (either the host device 300 or the docking station 370), or else may be integral with or attached to the interface 120 or 230 (if wire-based) or the interactive display unit 130 or 240, either as a traditional dipole style antenna, a microstrip patch, or any other suitable type of antenna. Microstrip antennas (or "smart antennas") commonly utilize multiple antennas, which may improve the signal-to-noise ratio, reduce interference and increase the overall clarity and range of the signal. Portions of the antenna may also be incorporated into various parts of the garment 200. For example, the antenna may run along the seam of the garment 200, allowing for the possibility of a relatively long yet concealed antenna. The antenna preferably enables long-range, high-quality, high-speed wireless communication. Also, the antenna is preferably designed to provide the necessary bandwidth, high signal-to noise ratio and gain for reasonable quality wireless communication. The antenna is preferably lightweight, discrete, durable and, if integrated into the garment, flexible.

FIG. 6 illustrates an example of an interactive communication unit 600 in accordance with one embodiment as disclosed herein. The interactive communication unit 600 is preferably of a low profile design and is unobtrusive in appearance. Its design should be consistent with the functionality of the clothing for which it is to be used. As illustrated in FIG. 6, the interactive communication unit 600 may comprise a display 610 using, e.g., a low-power-liquid crystal technology, allowing presentation of alphanumeric images and/or graphical images. While the display 610 is depicted in FIG. 6 as rectangular, it may be oval, round, or any other shape as desired. A protective faceplate 660 may surround the display 610, and may also serve a decorative function. For example, the faceplate 660 may be replaceable, allowing different colors and/or designs to be used. The faceplate 660 is preferably constructed of a strong, resilient, lightweight and anti-corrosive material, and may be made of, e.g., rubber, plastic, or painted or treated metal. A rubber seal may be placed beneath the faceplate 660 to help provide moisture resistance. An optional flip cover 690 may be located above the display 610, to provide additional protection to the display, or privacy.

In addition to a display 610, the interactive communication unit 600 may also have a microphone 620 for one-way or bi-directional communication or voice activation. If voice activation if provided, automated speech recognition (ASR) software or electronics may be resident in the host unit for interpreting spoken words and phrases by the wearer. An electronic data signal (analog or digital) may be transported from the microphone 620 to the host unit via an interface, such as signal line 675, for further processing by the host unit (including, if applicable, any automated speech recognition software or electronics).

A small light 630 (e.g., light emitting diode or LED) may be located so that it is visible through a hole or window in the faceplate 660, and may be used to indicate certain status conditions—for example, the light 630 may flash when the wearer has received a message, has an incoming call, etc. The light 630 may be "directional" in nature—that is, of such a shape or construction (e.g., having a wedge-shaped lens) so as to allow viewing at only limited angles. In this manner, only the wearer, or someone positioned along the same line of sight, would be able to view the light 630, thus increasing the privacy of the wearer's activity.

The interactive communication unit 600 may also include one or more manually-activated operational buttons 640 and/or a toggle button 650 for purposes such as making menu selections, or activating certain functions. The interactive communication unit 600 may also have an on/off button to allow manual deactivation of the unit.

Any functionality provided by pagers, advanced messaging devices, and, if an optional speaker is included, cellular telephones may be provided by the interactive communication unit 600 (in connection with the host device). The interactive communication unit 600 may also provide Internet telephony functionality. An icon-driven menu library may be used to allow the wearer to select various options easily and conveniently. As one example, where an optional speaker is provided (which may be plugged into the host unit), the wearer may be able to make musical selections and control sound volume using the operational buttons 640 while viewing associated graphical information on the display 610. As another example, the wearer may be able to select between different modes (i.e., pager mode, telephone mode, IP telephony mode) using the operational buttons 640. With any of these embodiments, voice recognition may be provided so that the wearer can select various options without having to use manual operational buttons 640 (in fact, operational buttons 640 may be entirely omitted in certain embodiments).

The interactive communication unit 600 may include a microprocessor, analog-to-digital converter, digital signal processing circuitry, display driver, LED driver, and other electronic circuitry needed to interface with the interactive elements of the interactive communication unit 600 as well as to provide intelligent functionality to the device. The interactive communication unit 600 may have a memory, and preferably provides receipt/delivery confirmation for messaging, multiple alert modes and time/clock stamping, all of which are well known in the field of paging and/or advanced messaging.

The interactive communication unit 600 may be placed anywhere on the garment that will support its weight and provide for convenient access by the wearer. One viable option is the end of the sleeve (e.g., cuff 680) of a garment, as shown in FIG. 6. Another possibility is the collar 250 (see FIG. 2). The interactive communication unit 600 may be either affixed to the garment or removable. If fixed to the garment, a flexible webbing 661 and boss technology similar to that described in connection with FIGS. 4A and 4B may be used to secure the unit to the garment.

A stiffening mechanism 670 may be added to connect the interactive communication unit 600 to the signal line 675 (and a similar stiffening mechanism may also be added between the host unit or the docking station 370 and the signal line at the opposite end). The stiffening mechanism 670 may function to limit the deflection of the signal line 675 (e.g., wire) to less than a specified amount, for example, forty-five degrees. The stiffening mechanism 670 may be implemented through a two piece assembly with a tongue-like geometry and a notch running through the length of the assembly to accommodate for wires. A non-conductive sealant may be applied to the notch to create a permanent and moisture-resistant seal.

Figure 7A:
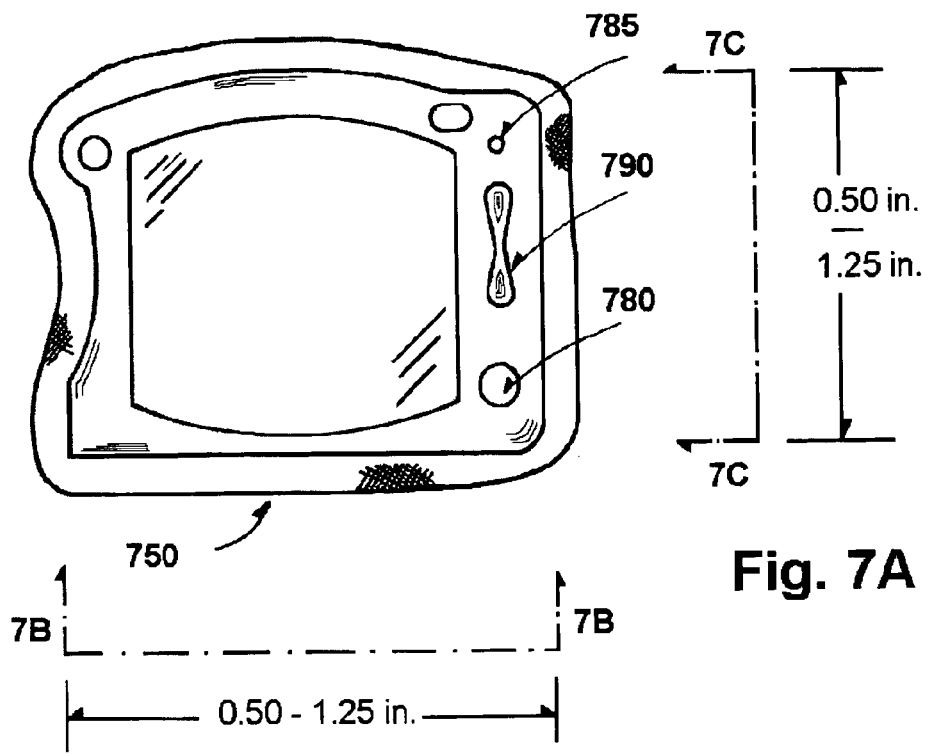
FIGS. 7A, 7B and 7C are diagrams, from various perspectives, illustrating one possible style for the interactive communication unit, including possible dimensions.
Figure 7B:
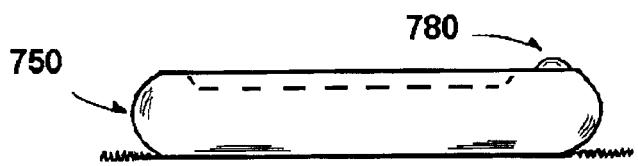
Figure 7C:
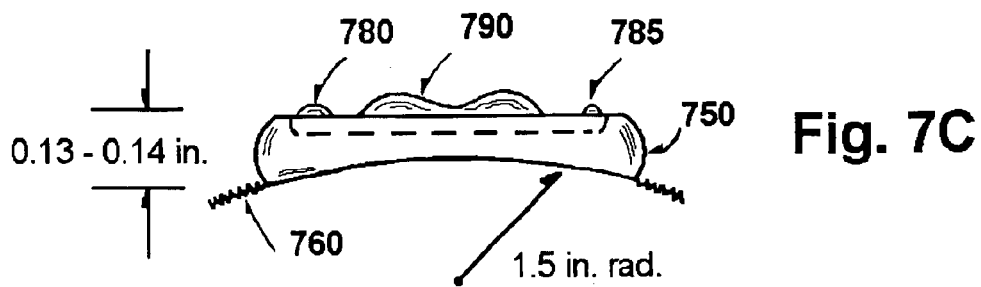

FIGS. 7A, 7B and 7C are diagrams, from various perspectives, illustrating in more detail one possible style for the interactive communication unit, including possible dimensions. FIG. 7A provides a top-down view of an interactive communication unit 750, while FIG. 7B shows one side view of the interactive communication unit 750, and FIG. 7C shows another side view of the interactive communication unit 750, relative to the curved surface 760 of the wearer's arm or wrist area. The bottom of the interactive communication unit 750 may, as illustrate in FIG. 7C, be curved so that it fits snugly on a wearer's arm or wrist area.

The wireless communication apparatus, in any of its various embodiments as described herein, may be used for messaging, voice communication, entertainment, or educational purposes. Various embodiments as described herein may offer unencumbered mobility, a convenient screen location, an ergonomic design, distributed weight, a potential for always on capability, a potential for an extended battery life, a decreased risk of loss or theft and fashion-ableness.

While preferred embodiments are disclosed herein, many variations are possible which remain within the concept and scope of the invention. Such variations would become clear to one skilled in the art after inspection of the specification and drawings herein. Since numerous alternatives and modifications are available, it is not desired to limit the invention to the exact construction, operation, placement, dimensions, or relationship to the exact illustrations shown and described. The invention therefore is not to be restricted except within the spirit and scope of any appended claims.

What is claimed is:

1. A user-wearable communication device, comprising:

a garment;

a microprocessor-based, software-programmable host unit securably affixed to said garment in a manner and location such that the presence of the host unit, and its location and manner of being affixed, are substantially unobservable;

a two-way interactive communication unit separately and securably affixed to said garment; and an interface connecting said host unit to said interactive communication unit and one or more peripheral electronic appliances;

wherein said host unit, comprises:

a docking station securably affixed to said garment, said docking station having an electronic interface which accommodates said host unit and is configured to allow said host unit to be mounted flushly therein, said docking station having a docking housing adapted to engage with a sufficient portion of a host unit housing so as to securably retain the host unit in the docking station;

a mechanical, pressure-based locking mechanism adapted to allow rapid secured placement and removal of the host unit from said docking station; and a battery power source internal to said host unit.

2. The user-wearable communication device of claim 1, wherein said host device includes at least one interactive feature allowing radio frequency (RF) communication for carrying out point-to-point and point-to-multipoint voice and data transfer via a wireless system when said host device is removed from said docking station.

3. The user-wearable communication device of claim 2, wherein said at least one interactive feature includes a speaker, a microphone, a graphical display, or one or more user-activated buttons.

4. The user-wearable communication device of claim 2, wherein said host device further comprises a plurality of data entry ports for communication with said interactive communication unit and with a device independent of and unattached to said garment.

5. The user-wearable communication device of claim 4, wherein said data entry ports comprise an infrared data port for line-of-sight communication between said host device and the device independent of and unattached to said garment.

6. The user-wearable communication device of claim 1, further comprising a second host unit having different features or functions than said host unit, said docking station adapted to interchangeably receive and secure both said host unit and said second host unit.

7. The user-wearable communication device of claim 1, wherein said host unit is connected to an antenna attached to and integral with said garment.

8. The user-wearable communication device of claim 1, wherein said docking station is securably affixed to the interior portion of the torso region of said garment, and where said interactive communication unit is securably attached to a sleeve of said garment.

9. The user-wearable communication device of claim 8, wherein said interface connecting said host unit and said interactive unit is integrated into said garment.

10. The user-wearable communication device of claim 1, wherein said garment comprises a sleeve, and said interactive communication unit comprises a graphical display securably attached at or near an end of said sleeve.

11. The user-wearable communication device of claim 1, further comprising a wireless interface among said host unit, said interactive communication device, and said peripheral electronic appliances, wherein each of said components contain a localized power source and a transmitter/receiver.

12. The user-wearable communication device of claim 1, wherein said host unit comprises an integrated, internal power source and one or more interactive data ports for connecting to said one or more external peripheral electronic appliances, and an interface for receiving an external recharging signal.

13. The user-wearable communication device of claim 12, further comprising a remote speaker connected to one of said data ports of said host unit, said remote speaker integral with said garment and located on or near a collar region of said garment.

14. The user-wearable communication device of claim 13, wherein said host unit comprises electronics and embedded software for playing music in a digitally recorded format and routing audio signals generated by playing the music to said remote speaker connected via said data port.

15. The user-wearable communication device of claim 1, wherein said host unit comprises a pager or messaging device, and wherein messages are received over radio frequencies by said host unit and displayed on a graphical display of said interactive communication unit.

16. The user-wearable communication device of claim 1, wherein said host unit comprises a removable flash memory.

17. The user-wearable communication device of claim 1, wherein said mechanical, pressure-based locking mechanism provides pressure contact between said host unit and the docking station so as to maintain continuous pressure and electrical contact across the electronic interface during wearer motion and activity.

18. The user-wearable communication device of claim 17, wherein said mechanical, pressure-based locking mechanism comprises complementary screw-type threading on said host unit and said docking station.

19. The user-wearable communication device of claim 1, wherein said host unit is moisture, corrosion and shock resistant.

20. The user-wearable communication device of claim 1, wherein said host unit comprises a host display viewable and operable when said host unit is removed from said docking station, and wherein said host unit automatically shuts off said host display when the presence of said interactive communication unit is detected.

21. The user-wearable communication device of claim 1, wherein said host device is tactilely symmetrical so as to facilitate use by both left-handed and right-handed wearers.

22. The user-wearable communication device of claim 1, wherein said host unit comprises a port for host unit battery recharging.

23. A user-wearable communication device, comprising:
   a garment;
   a microprocessor-based, software-programmable host unit securably affixed to said garment in a manner and location such that the presence of the host unit, and its location and manner of being affixed, are substantially unobservable;
   a two-way interactive communication unit separately and securably affixed to said garment; and
   an interface connecting said host unit to said interactive communication unit and one or more peripheral electronic appliances;
   wherein said garment comprises a sleeve, and said interactive communication unit comprises a graphical display securably attached at or near an end of said sleeve; and
   wherein said interactive communication unit comprises a speaker and a directional messaging light located on said interactive communication unit to facilitate observation by a wearer of the user-wearable communication device but to hinder observation by others.

24. The user-wearable communication device of claim 23, wherein said host unit comprises a voice recognition system, said host device receiving voice data captured by said speaker and conveyed across said interface to said host device.

25. A user-wearable communication device, comprising:
   a garment;
   a microprocessor-based, software-programmable host unit securably affixed to said garment in a manner and location such that the presence of the host unit, and its location and manner of being affixed, are substantially unobservable;
   a two-way interactive communication unit separately and securably affixed to said garment; and
   an interface connecting said host unit to said interactive communication unit and one or more peripheral electronic appliances;
   wherein said garment comprises a sleeve, and said interactive communication unit comprises a graphical display securably attached at or near an end of said sleeve; and
   wherein said interactive communication unit comprises one or more manually activated buttons for controlling presentation and the selection of features on said graphical display.

26. A user-wearable communication device, comprising:
   a garment;
   a microprocessor-based, software-programmable host unit securably affixed to said garment in a manner and location such that the presence of the host unit, and its location and manner of being affixed, are substantially unobservable;
   a two-way interactive communication unit separately and securably affixed to said garment; and
   an interface connecting said host unit to said interactive communication unit and one or more peripheral electronic appliances;

wherein said host unit and said interactive communication unit are connected to an ancillary photovoltaic power source located on a collar region or sleeve of said garment or integrated with the interactive communication unit.

27. A multi-function, self-contained, microprocessor-based system-in-a-package host device assembly, comprising:

a docking station;

a host device housing encasing host device electronics, said host device housing capable of being removed from or flushly secured to said docking station, said docking station securably attached to an interior portion of a garment such that the presence of the host device, and its location and manner of being affixed, are substantially unobservable, and having surfaces substantially surrounding a sufficient portion of said host device when secured to said docking station so as to effectively lock and retain said host device securably in said docking station;

electrical contacts on said host device housing for interfacing with complementary electrical contacts on the docking station when said host device is attached thereto;

an internal power source; and at least one user-interactive component operable in connection with said host device when said host device housing is removed from said docking station;

wherein, when said host device housing is secured to said docking station, said host device is electronically coupled to and controls at least one peripheral device; and wherein said docking station is securably affixed, through the adherence of a natural or synthetic material flange, to the garment.

28. The multi-function, self-contained, microprocessor-based system-in-a-package host device assembly of claim 27, further comprising an embedded microprocessor configured to control or communicate with said at least one user interactive component, and wherein said at least one user interactive component comprises a microphone, a speaker, a graphical display, or one or more user-activated buttons.

29. The multi-function, self-contained, microprocessor-based system-in-a-package host device assembly of claim 28, wherein said at least one peripheral device comprises an interactive communication unit securably attached to a sleeve of the garment, wherein said host device housing encapsulates microprocessor-based circuitry for controlling two-way interactive communication functions, and wherein, when said host device housing is secured to the docking station, said electronic circuitry controls activity of said interactive communication unit.

30. The multi-function, self-contained, microprocessor-based system-in-a-package host device assembly of claim 29, wherein said host device housing connects to an antenna attached to and integral with the garment, and wherein said microprocessor-based circuitry is configured for full-duplex communication over a wireless communication channel.

31. An interactive communication unit, comprising:

a casing affixed to a sleeve of a garment;

at least one user-interactive component integrated into said casing, said at least one user-interactive component comprising a speaker and microphone for carrying out two-way voice communication and a plurality of manually activated buttons located on said casing; and electronics housed within said casing for interfacing with said at least one interactive component, and for receiving data from and sending data to a remote host unit securably attached to the garment, said electronics within said casing being electronically coupled to said host unit through conductors integrated with the garment.

32. The interactive communication unit of claim 31, wherein said casing is affixed to said garment in a location such that the interactive component is either visually, audibly, or tactilely accessible to a wearer of the garment.

33. The interactive communication unit of claim 32, wherein said casing is affixed near the end of the sleeve of said garment.

34. The interactive communication unit of claim 31, wherein said at least one interactive component includes a graphical display.

35. The interactive communication unit of claim 31, wherein said electronics in said casing are electronically coupled using conductive filaments or conductive tape to said host unit.

36. An apparatus, comprising:

a garment having sleeves;

a docking station securably affixed to an interior portion of said garment, said docking station adapted to receive a host device containing an internal battery power source and to allow said host device to be mounted flushly therein, said docking station having a docking housing adapted to engage with a sufficient portion of a host unit housing so as to securably retain the host unit in the docking station; and a two-way interactive communication unit separately and securably attached to a sleeve of said garment, said interactive unit configured to communicate with said host device.

37. The apparatus of claim 36, wherein said host device provides wireless functionality, and wherein said docking station is adapted to receive a second host device having different functionality than said host device.

38. A method of assembling a microprocessor-based system-in-a-package wireless communication apparatus and a garment, comprising the steps of:

securably attaching a host unit to a garment having sleeves in a manner and location such that the presence of the host unit, and its location and manner of being affixed, are substantially unobservable;

securably attaching a two-way interactive communication unit to one of the sleeves of the garment;

connecting said host unit to said two-way interactive communication unit across an interface;

connecting said host unit one or more peripheral electronic appliances across said interface; and connecting said host unit and said interactive communication unit to an ancillary photovoltaic power source located on a collar region or sleeve of said garment or integrated with the interactive communication unit.

39. The method of claim 38, wherein said step of connecting said host unit to said interactive communication unit across said interface comprises the step of connecting said host unit to said interactive communication via a wireless connection.

40. The method of claim 38, wherein said step of connecting said host unit to said interactive communication unit across said interface comprises the step of connecting said host unit to said interactive communication via a wired connection.

* * * * *